US010121147B2

(12) United States Patent
Greenspan et al.

(10) Patent No.: US 10,121,147 B2
(45) Date of Patent: Nov. 6, 2018

(54) METHODS OF PROCESSING TRANSACTIONS AND RELATED SYSTEMS AND COMPUTER PROGRAM PRODUCTS

(71) Applicant: CA, INC., Islandia, NY (US)

(72) Inventors: Steven L. Greenspan, Scotch Plains, NJ (US); Geoffrey R. Hird, Cupertino, CA (US)

(73) Assignee: CA, INC., Islandia, NY (US)

( * ) Notice: Subject to any disclaimer, the term of this patent is extended or adjusted under 35 U.S.C. 154(b) by 1140 days.

(21) Appl. No.: 14/310,256

(22) Filed: Jun. 20, 2014

(65) Prior Publication Data

US 2015/0371230 A1     Dec. 24, 2015

(51) Int. Cl.
  *G06Q 20/40*   (2012.01)
  *G06Q 20/12*   (2012.01)
  *G06Q 20/32*   (2012.01)

(52) U.S. Cl.
  CPC ......... *G06Q 20/407* (2013.01); *G06Q 20/12* (2013.01); *G06Q 20/325* (2013.01); *G06Q 20/405* (2013.01)

(58) Field of Classification Search
  USPC ...................................... 705/35–44
  See application file for complete search history.

(56) References Cited

U.S. PATENT DOCUMENTS

| | | | |
|---|---|---|---|
| 5,708,422 A | 1/1998 | Blonder et al. | |
| 5,914,472 A | 6/1999 | Foladare et al. | |
| 6,327,348 B1 | 12/2001 | Walker et al. | |
| 7,096,192 B1 | 8/2006 | Pettitt | |
| 7,264,154 B2 | 9/2007 | Harris | |
| 7,380,707 B1 | 6/2008 | Fredman | |
| 7,444,304 B2 | 10/2008 | Mellinger et al. | |
| 7,676,429 B2 | 3/2010 | Boyle et al. | |
| 7,743,979 B2 | 6/2010 | Fredman | |
| 7,752,084 B2 | 7/2010 | Pettitt | |
| 8,145,549 B2 | 3/2012 | Das | |

(Continued)

OTHER PUBLICATIONS

Anthony Bouch, ."3-D Secure: A critical review of 3-D Secure and its effectiveness in preventing card not present fraud," University of London, Mar. 2011.

*Primary Examiner* — Alexander G Kalinowski
*Assistant Examiner* — Hatem M Ali
(74) *Attorney, Agent, or Firm* — Sage Patent Group

(57) ABSTRACT

A method of operating an authentication node is disclosed. Transaction information for a transaction is received from a merchant node. The transaction information includes an identification for a credit/debit account, a name on the credit/debit account, and a transaction amount for the transaction. Responsive to receiving the transaction information, a complete account number for the credit/debit account is determined using the identification for the credit/debit account and the name on the credit/debit account. The identification for the credit/debit account is different than the complete account number for the credit/debit account. In addition, account information may be transmitted to an acquirer node, and the account information may include the complete account number for the credit/debit account, the name on the credit/debit account, and the transaction amount. Related methods of operating merchant nodes, related computer program products, and related computer systems are also disclosed.

20 Claims, 5 Drawing Sheets

(56) References Cited

U.S. PATENT DOCUMENTS

| | | |
|---|---|---|
| 8,306,907 B2 | 11/2012 | Das |
| 2002/0077837 A1* | 6/2002 | Krueger et al. .................. 705/1 |
| 2011/0153440 A1 | 6/2011 | Singhal |
| 2011/0153461 A1 | 6/2011 | Royyuru |
| 2011/0313898 A1* | 12/2011 | Singhal et al. ................. 705/30 |
| 2012/0317018 A1* | 12/2012 | Barnett ................ G06Q 20/383 |
| | | 705/39 |

* cited by examiner

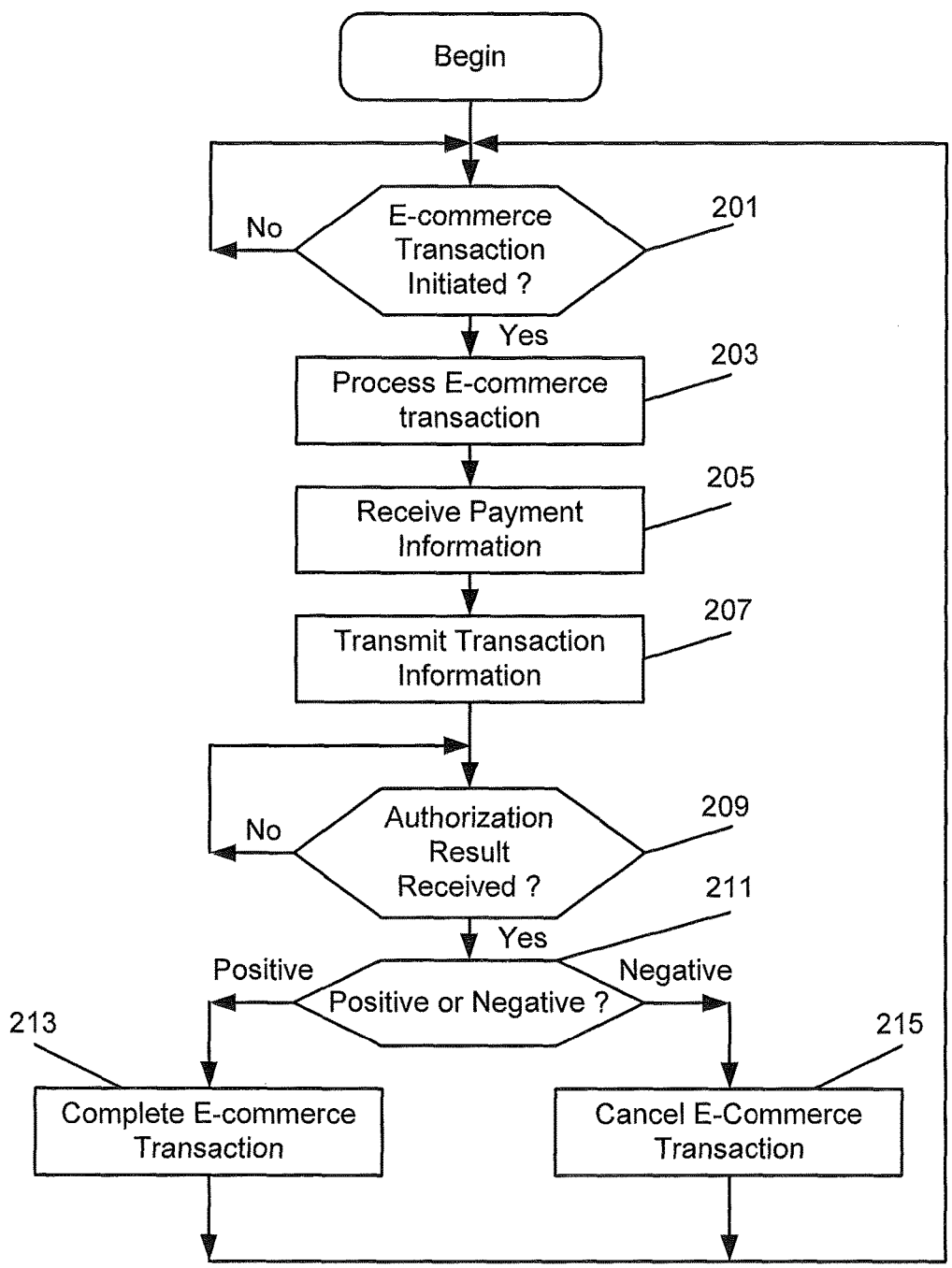

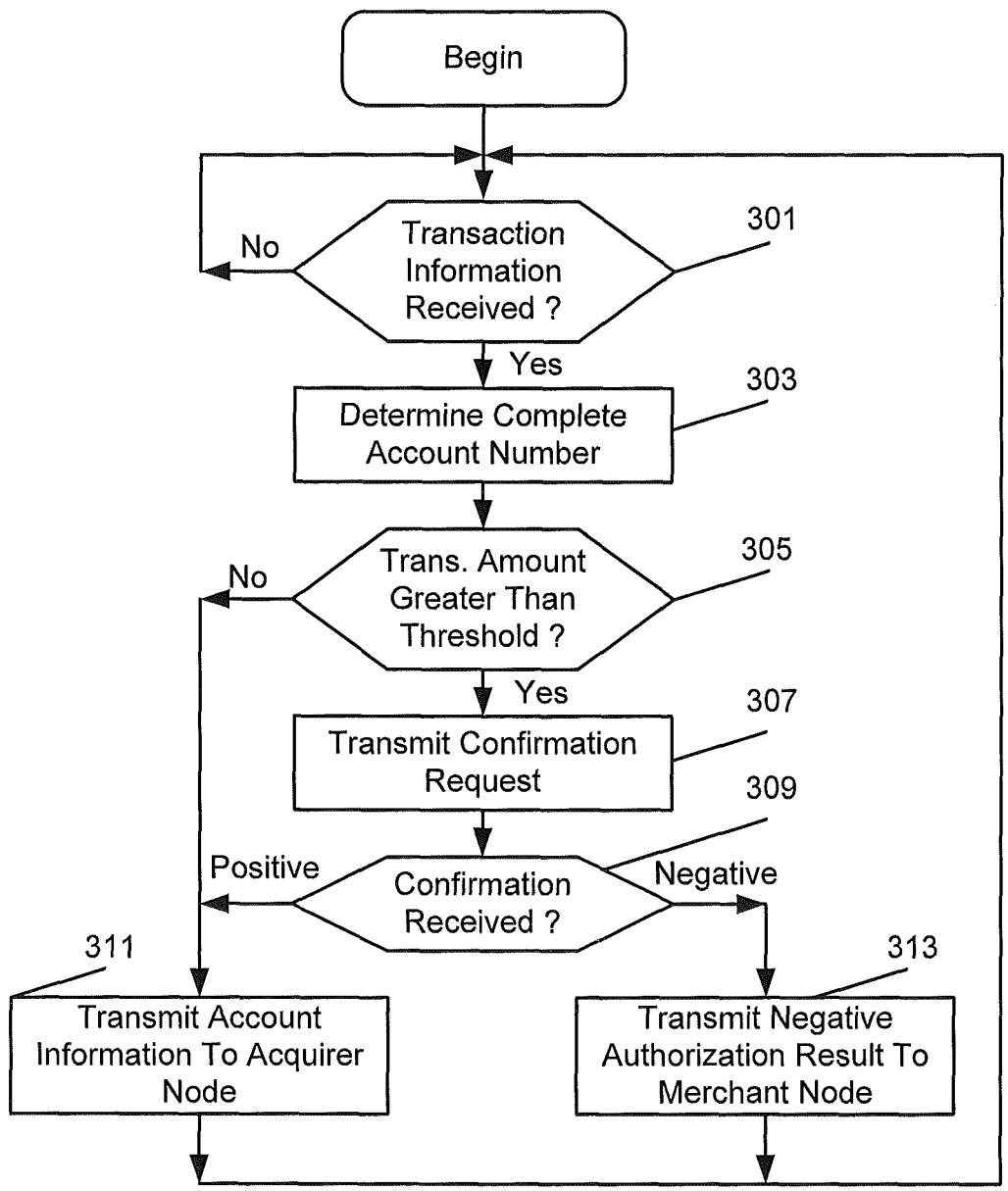

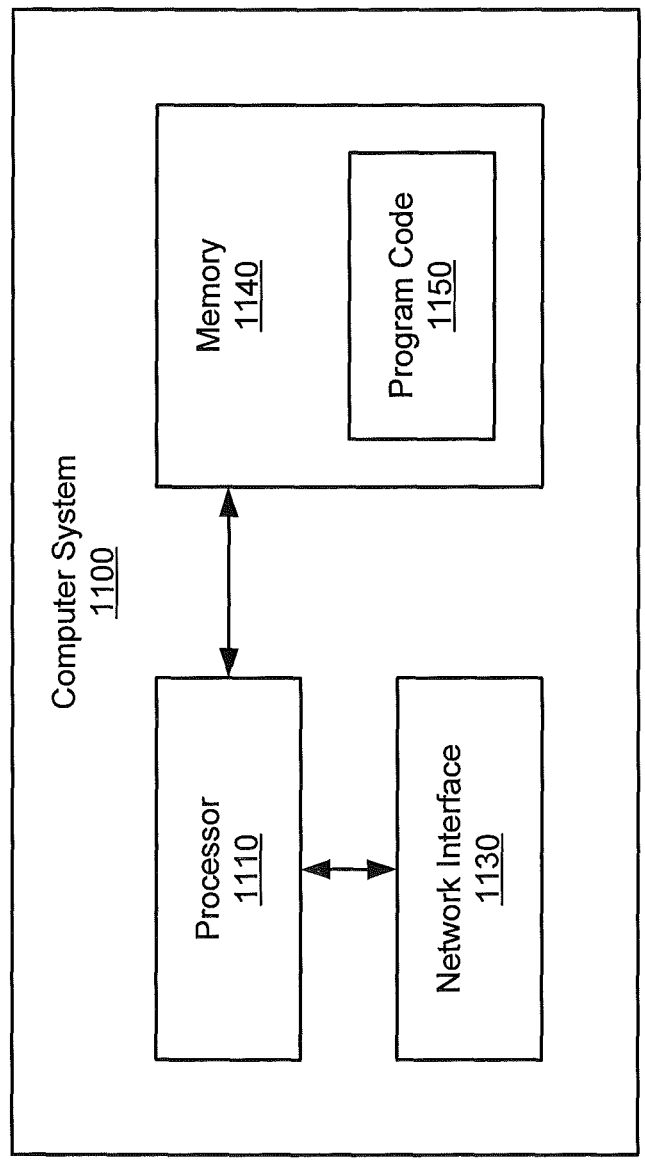

Figure 5

| Credit/Debit Account No. | Identification For Credit/Debit Account | Name on Credit/Debit Account | Contact Information | Threshold |
|---|---|---|---|---|
| Account #1 | Identification #1 | Cardholder Name #1 | Contact #1 | Threshold #1 |
| Account #2 | Identification #2 | Cardholder Name #2 | Contact #2 | Threshold #2 |
| Account #3 | Identification #3 | Cardholder Name #3 | Contact #3 | Threshold #3 |
| Account #4 | Identification #4 | Cardholder Name #4 | Contact #4 | Threshold #4 |
| *** | *** | *** | *** | *** |
| Account #n | Identification #n | Cardholder Name #n | Contact #n | Threshold #n |

METHODS OF PROCESSING TRANSACTIONS AND RELATED SYSTEMS AND COMPUTER PROGRAM PRODUCTS

BACKGROUND

The present disclosure relates to financial transactions, and more particularly, to processing financial transactions and related systems and computer program products.

Financial transactions relating to purchasing goods and services are often paid for using credit and/or debit accounts that an account owner (also the customer/purchaser) accesses using associated credit and/or debit cards. The account owner may also be referred to as a cardholder. Financial transaction processing systems may provide authentication and/or verification processes that allow merchants to verify that account information is valid and that the account owner has sufficient credit/debit funds to cover the purchase.

When a customer (also referred to as a purchaser) is located at the merchant's facility (e.g., a "brick and mortar" store) for a card present or CP transaction, the merchant may be responsible for authenticating that the customer is the account owner, for example, by comparing the customer's signature to a existing signature on the physical card, examining a picture ID of the customer, and/or requiring a customer's password to complete the transaction.

For electronic commerce ("e-commerce") transactions when a consumer shops on-line (e.g., using a merchant's website) or using other remote access (e.g., via telephone), also known as card-not-present or CNP transactions, the consumer typically provides the on-line (or otherwise remote) merchant with a credit (or debit) card number, credit card validation (CCV) number, billing address, and/or other PII (personally identifiable information).

Several alternatives (beyond encryption of the transaction) have been proposed to make online/CNP transactions more secure. For example, the credit card verification (CCV) number (a 3 or 4 digit identification number on the back of the credit card) is not stored by merchants and is used by the consumer to "demonstrate" that he/she owns (or at least is in possession of) the physical card. Alternatively, PayPal provides a $3^{rd}$ party solution in which a third party (PayPal) performs payment processing for on-line merchants.

SUMMARY

Some embodiments disclosed herein are directed to a method of operating an authentication node. The method includes receiving transaction information for a transaction from a merchant node, and the transaction information includes an identification for a credit/debit account, a name on the credit/debit account, and a transaction amount for the transaction. Responsive to receiving the transaction information, a complete account number for the credit/debit account (e.g., a Primary Account Number or PAN) is determined using the identification for the credit/debit account and the name on the credit/debit account, and the identification for the credit/debit account is different than the complete account number for the credit/debit account. In addition, account information may be transmitted to an acquirer node, and the account information may include the complete account number for the credit/debit account, the name on the credit/debit account, and the transaction amount.

Some other embodiments disclosed herein are directed to a method of operating a merchant node. The method includes receiving payment information for a transaction. The payment information includes an identification for a credit/debit account and a name on the credit/debit account, and the identification is different than a complete account number for the credit/debit account. Responsive to receiving the payment information, transaction information for the transaction is transmitted from the merchant node to an authentication node, and the transaction information includes the identification for the credit/debit account, the name on the credit/debit account, and a transaction amount. After transmitting the transaction information, an authorization result for the transaction is received, and responsive to receiving the authorization result, the transaction is processed.

Still other embodiments disclosed herein are directed to a computer system including a processor and a memory coupled to the processor. The memory includes computer readable program code that when executed by the processor causes the processor to perform operations including: receiving transaction information for a transaction from a merchant node, wherein the transaction information includes an identification for a credit/debit account, a name on the credit/debit account, and a transaction amount for the transaction; and determining a complete account number for the credit/debit account using the identification for the credit/debit account and the name on the credit/debit account responsive to receiving the transaction information, wherein the identification for the credit/debit account is different than the complete account number for the credit/debit account. In addition, the memory may include computer readable program code that when executed by the processor causes the processor to perform operations including: transmitting account information to an acquirer node, wherein the account information includes the complete account number for the credit/debit account, the name on the credit/debit account, and the transaction amount.

Yet other embodiments disclosed herein are directed to a computer program product including a computer readable storage medium. The computer readable storage medium has computer readable program code embodied in the computer readable storage medium that when executed by a processor of a computer system causes the computer system to perform operations including: receiving transaction information for an e-commerce transaction from a merchant node, wherein the transaction information includes an identification for a credit/debit account, a name on the credit/debit account, and a transaction amount for the e-commerce transaction; and determining a complete account number for the credit/debit account using the identification for the credit/debit account and the name on the credit/debit account responsive to receiving the transaction information, wherein the identification for the credit/debit account is different than the complete account number for the credit/debit account. In addition, the computer readable storage medium may have computer readable program code embodied in the computer readable storage medium that when executed by a processor of a computer system causes the computer system to perform operations including: transmitting account information to an acquirer node, wherein the account information includes the complete account number for the credit/debit account, the name on the credit/debit account, and the transaction amount.

Further embodiments disclosed herein are directed to a computer system including a processor and a memory coupled to the processor. The memory includes computer readable program code that when executed by the processor causes the processor to perform operations including:

receiving payment information for a transaction, wherein the payment information includes an identification for a credit/debit account and a name on the credit/debit account, wherein the identification is different than a complete account number for the credit/debit account; responsive to receiving the payment information, transmitting transaction information for the transaction from the merchant node to an authentication node, wherein the transaction information includes the identification for the credit/debit account, the name on the credit/debit account, and a transaction amount; after transmitting the transaction information, receiving an authorization result for the transaction; and responsive to receiving the authorization result, processing the transaction.

More embodiments disclosed herein are directed to a computer program product including a computer readable storage medium. The computer readable storage medium has computer readable program code embodied in the computer readable storage medium that when executed by a processor of a computer system causes the computer system to perform operations including: receiving payment information for a transaction, wherein the payment information includes an identification for a credit/debit account and a name on the credit/debit account, wherein the identification is different than a complete account number for the credit/debit account; responsive to receiving the payment information, transmitting transaction information for the transaction from the merchant node to an authentication node, wherein the transaction information includes the identification for the credit/debit account, the name on the credit/debit account, and a transaction amount; after transmitting the transaction information, receiving an authorization result for the transaction; and responsive to receiving the authorization result, processing the transaction.

Other methods, authentication nodes, merchant nodes, computer systems, and computer program products according to embodiments of inventive concepts will be or become apparent to one with skill in the art upon review of the following drawings and detailed description. It is intended that all such additional methods, authentication nodes, merchant nodes, computer systems, and computer program products be included within this description and protected by the accompanying claims.

BRIEF DESCRIPTION OF THE DRAWINGS

Aspects of the present disclosure are illustrated by way of example and are not limited by the accompanying drawings. In the drawings:

FIGS. 2 and 3 are flowcharts that illustrate operations that may be performed by merchant and authentication nodes of FIG. 1, in accordance with some embodiments;

FIG. 4 is a block diagram of a computer system that may be used to implement various nodes of the system of FIG. 1, in accordance with some embodiments; and FIG. 5 is a block diagram illustrating a database that may be used by the authentication node of FIG. 1 in accordance with some embodiments.

DETAILED DESCRIPTION

Figure 1:
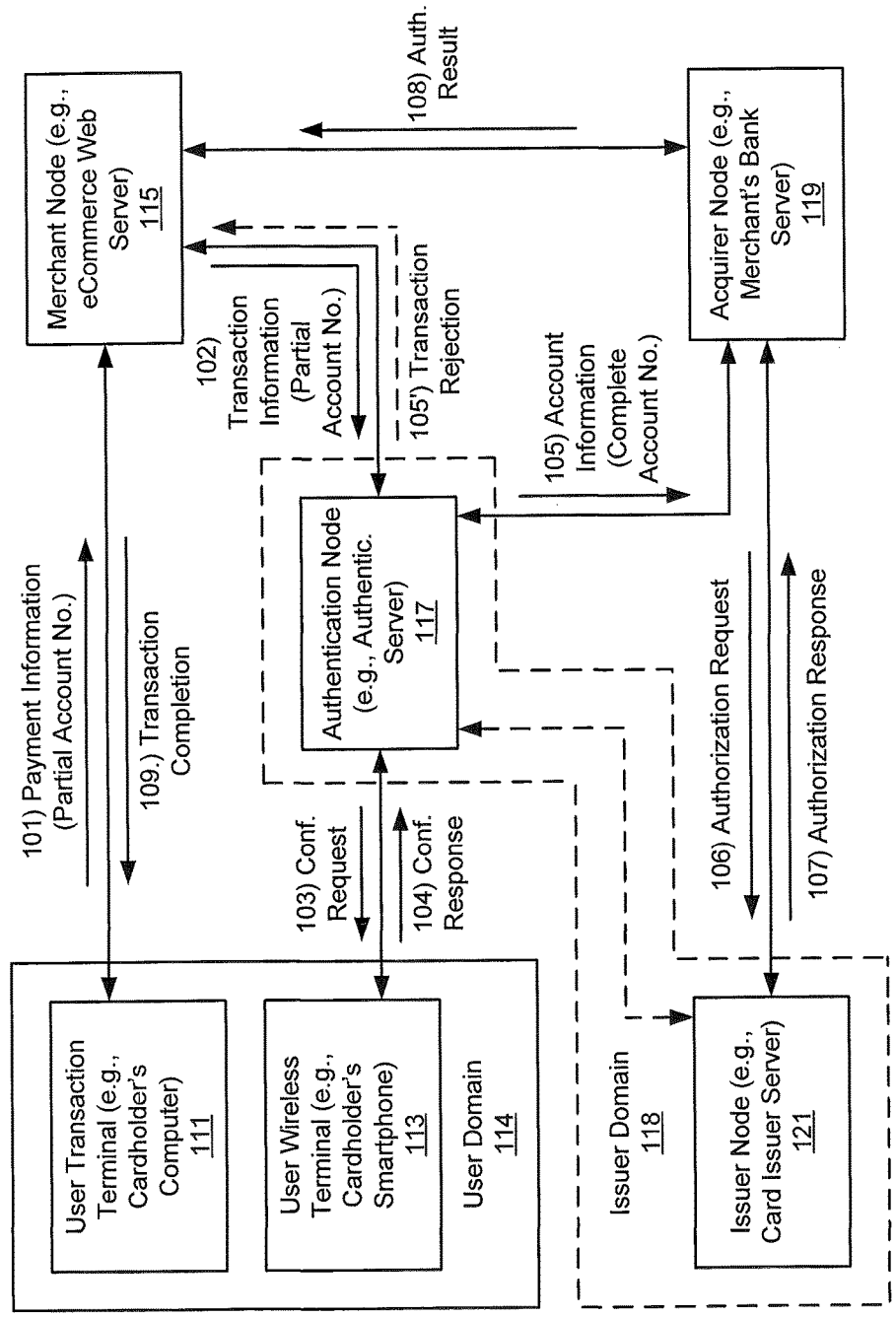
FIG. 1 is a block diagram illustrating elements involved in a financial transaction that includes an authentication node, in accordance with some embodiments.

Various embodiments will be described more fully hereinafter with reference to the accompanying drawings. Other embodiments may take many different forms and should not be construed as limited to the embodiments set forth herein. Like numbers refer to like elements throughout.

FIG. 1 is a block diagram illustrating elements/messages involved in a financial transaction including: a user transaction terminal 111 (also referred to as a user terminal) and a user wireless terminal 113 of a user domain 114; a merchant node 115; an authentication node 117, an acquirer node 119, and an issuer node 121. User transaction terminal 111 may be a computer system (e.g., a desktop computer, a laptop computer, a tablet computer, a point-of-sale merchant terminal, etc.) operated by a user (also referred to as a customer, purchaser, client, credit/debit cardholder, etc.), and merchant node 115 may be a computer system (e.g., an e-Commerce web server) operated by the merchant (also referred to as a vendor). The user/customer may thus use a browser application running on user transaction terminal 111 (acting as a client) to remotely access an e-Commerce website hosted by merchant node 115 (acting as a server) over a network (e.g., the Internet). The user/customer may thus remotely purchase goods and/or services from the merchant via an e-Commerce transaction. As shown, user domain 114 (i.e., devices operated by the user/customer) may include user wireless terminal 113 (e.g., a smartphone) separate from user transaction terminal 111. According to other embodiments, operations of user transaction terminal 111 and user wireless terminal 113 may be performed by a single device.

During a network session (e.g., an Internet session) between user transaction terminal 111 and merchant node 115, the user may select goods/services to be purchased, and merchant node 115 may provide a payment amount required to complete the transaction. Responsive to acceptance of the transaction (including the payment amount, also referred to as a transaction amount) by the user, user transaction terminal 111 may transmit a payment information message 101 to merchant node 115. The payment information message 101 may include an identification for a credit/debit account that is different that a complete account number for the credit/debit account (e.g., a partial account number) and a name on the credit/debit account (without providing the complete account number). Payment information message 101 may also include other information such as a billing address, a shipping address, and/or the transaction amount. Merchant node 115 will either complete or cancel the transaction based on an authentication result provided by acquirer node 119 and/or authentication node 117. Because the merchant node does not receive the complete account number, the complete account number cannot easily be stolen from the merchant node (e.g., by a hacker), and/or an unscrupulous merchant or an unscrupulous employee of the merchant cannot easily misuse the account number. Account information available at the merchant node may thus be reduced.

Authentication node 117 may be a computer system (e.g., an Authentication server) that is coupled to merchant node 115 over a network (e.g., the Internet), and authentication node 117 may receive transaction information (relating to the e-Commerce transaction) from merchant node 115. With respect to the transaction relating to message 101 discussed above, merchant node 115 may transmit transaction information message 102 including the identification for the credit/debit account (originally provided by user transaction terminal 111), the transaction amount, and the name on the credit/debit account (originally provided by user transaction terminal 111). Transaction information message 102 may also include a transaction identification used to identify messages relating to the transaction and/or a merchant identification/address for the merchant node.

As discussed in greater detail below, authentication node 117 may facilitate authentication of the e-Commerce transaction using this transaction information. Authentication node 117 can determine a complete account number for the credit/debit card used for the e-Commerce transaction using the identification for the credit/debit account and the name received in the transaction information message 102, and authentication node 117 can seek confirmation from the user that the transaction is valid. For example, authentication node 117 may transmit a confirmation request message 103 (e.g., identifying the merchant and transaction amount) via text, e-mail, etc. to user wireless terminal 113, and the user may transmit a confirmation response message 104 either confirming or rejecting the transaction via reply text, e-mail, etc. If authentication node 117 authorizes the transaction based on user confirmation, an account information message 105 (including the complete account number, and the transaction amount) is transmitted to acquirer node 119. If the user rejects the transaction in the confirmation response message 104, authentication node 117 may transmit a transaction rejection message 105' directly to merchant node 115. In addition, account information message 105 and/or transaction rejection message 105' may include the transaction identification and/or the merchant identification/address discussed above with respect to the transaction information message. By including the transaction identification in transaction rejection message 105' (and/or in a later authorization result message 108), merchant node 115 can match received messages with the respective transactions. The merchant identification/address can be used to route the message to the correct merchant node.

Acquirer node 119 may be a computer system (e.g., a server) operated by a bank used by the merchant (also referred to as the merchant's bank). Acquirer node 119 may use the account information received from authentication node 117 via account information message 105 to request authorization for the e-Commerce transaction from issuer node 121. More particularly, acquirer node 119 may transmit authorization request message 106 (including the account number and the transaction amount) to issuer node 121. Issuer node 121 may be a computer system (e.g., a server) for an issuer of the debit/credit card (e.g., MasterCard, Visa, American Express, etc.). Issuer node 121 may either authorize or reject the transaction based on a current status of the account (e.g., is the customer current with required minimum payments, is the account still active, are there sufficient debit funds available, has the associated card been reported stolen, etc.). Issuer node 121 may then transmit authorization response message 107 either authorizing or rejecting the transaction to acquirer node 119. In addition, authorization request message 106 and authorization response message 107 may include the transaction identification discussed above with respect to transaction information message 102 and account information message 105. By including the transaction identification in both of authorization request message 106 and authorization response message 107, acquirer node 119 can match authorization response messages with respective transactions.

Upon receipt of authorization response message 107 from issuer node 121, acquirer node 119 may transmit authorization result message 108 indicating authorization or rejection of the transaction. Merchant node 115 may either complete or cancel the transaction based on the authentication result provided via authorization result message 108 or transaction rejection message 105'. Merchant node 115 may transmit transaction completion message 109 to user transaction terminal 111 to inform the user that the transaction has been completed or rejected. In addition, authorization result message 108 may include the transaction identification discussed above with respect to transaction information message 102, account information message 105, authorization request message 106, and authorization response message 107, so that authorization response message 108 can be matched with the respective transaction. Authorization response message 108 may also include the merchant identification/address to route the authorization result message to the correct merchant node.

By including the transaction identification in authorization result message 108, merchant node 115 can match authorization result message 108 with the respective transaction relating to the corresponding transaction information message 102 for the transaction. Stated in other words, messages for a given transaction (e.g., transaction information message 102, account information message 105, transaction rejection message 105', authorization request message 106, authorization response message 107, authorization result message, etc.) may include a same transaction identification. The transaction identification may thus uniquely identify a particular transaction. For example, the transaction identification may be a unique code (e.g., an alphanumeric sequence) that is randomly assigned by merchant node 115 and/or that is derived from information provided in the payment information message (e.g., the identification for the credit/debit account, the name on the credit/debit account, the billing address, the shipping address, the transaction amount, time/date of the transaction, etc.). The merchant identification/address may be separate from the transaction identification, or elements of the two may be combined.

According to some embodiments, remote communication links between user transaction terminal 111 and merchant node 115, between merchant node 115 and authentication node 117, between authentication node 117 and acquirer node 119, between acquirer node 119 and issuer node 121, and between acquirer node 119 and merchant node 115 may be provided over a data network or networks (e.g., a local area network/networks LAN/LANs, a wide area network/networks WAN/WANs, the Internet, etc.). According to some embodiments, remote communication links between authentication node 117 and user wireless terminal may be provided over a data network (e.g., a local area network/networks LAN/LANs, a wide area network/networks WAN/WANs, the Internet, etc.) and/or over a wireless network/networks (e.g., a cellular radiotelephone network). Communications between merchant node 115 and the customer/user and between authentication node 117 and the customer/user may thus be provided over different/independent channels. As shown in FIG. 1, the customer/user may use different devices (e.g., a user transaction terminal 111 and a user wireless terminal 113) to communicate with merchant node 115 and authentication node 117. According to other embodiments, the customer/user may use a same device (e.g., a user transaction terminal 111) to communicate with both merchant node 115 and authentication node 117 via different/independent communication channels. When using a same device (e.g., user transaction terminal 111), for example, a browser application may be used to communicate with merchant node 115 over an Internet session, and an e-mail or text application may be used to communicate with authentication node 117.

Elements/messages of FIG. 1 have been briefly introduced above to facilitate the following more detailed description of embodiments of present inventive concepts. Although some embodiments are described in the context of authenticating credit card and/or debit card transactions for purchases made through a merchant's node 120 (e.g., merchant's e-commerce Web server), the embodiments disclosed herein are not limited thereto and can be used with other types of authentication processes, such as, telephone and/or in-person (card present) transactions.

According to some embodiments of present inventive concepts, authentication node 117 may be operated by a third party (i.e., operated by an entity other than the user/customer and other than the merchant) so that the merchant does not receive or store a complete credit/debit account number (e.g., a Primary Account Number or PAN). In addition, the complete account number may be omitted from the physical credit/debit card to reduce the amount of information that is visible on the card. Instead, only a portion of the account number (e.g., the last four digits) may be provided (visible or otherwise) on the card.

Moreover, users/customers do not have to separately register with the third party authentication node 117. Instead, users/customers can register for the service through their credit/debit card issuer (i.e., the issuer operating the issuer node), and the issuer can provide account information to authentication node 117.

As indicated by dotted lines, authentication node 117 may be part of an issuer domain 118 including both authentication node 117 and issuer node 121, and both nodes may be operated directly by the issuer. According to some other embodiments, separate entities may operate authentication and issuer nodes. According to still other embodiments, operations of authentication node 117 and issuer node 121 may be consolidated into a single issuer node. According to yet other embodiments, operations of authentication node 117, issuer node 121, and acquirer node may be consolidated into a single issuer/acquirer node 119.

Merchants may thus only be provided with a portion of the complete credit/debit account number so that an employee of the merchant and/or a hacker may be unable to easily obtain sufficient information from the merchant node or related merchant systems to make fraudulent charges on customer/user credit/debit accounts. Because complete credit/debit account numbers are not provided to merchant node 115, network security at merchant node 115 may be somewhat reduced relative to other nodes where the complete credit/debit account number is known/processed (e.g., authentication node 117, acquirer node 119, and/or issuer node 121). Accordingly, many merchant nodes operating in such a system may operate using reduced security measures relative to authentication node 117, acquirer node 119, and/or issuer node 121. Relatively higher levels of security may already be required at acquirer and issuer nodes 119 and 121, and similarly higher levels of security at authentication node 117 may be cost effective relative to providing such higher levels of security at every merchant node.

According to some embodiments, a user/customer may shop on-line (e.g., using user transaction terminal 111), and when purchasing an item, the user/customer may provide payment information (e.g., via payment information message 101) to the merchant (e.g., merchant node 115) including the last 4-digits of the credit/debit card account used for payment, a billing/shipping address for the credit/debit card account, and a name that appears on the credit/debit card account. This payment information is recorded by the merchant (e.g., by the merchant node 115), and the merchant can store this data (with the consumer's permission) for future transactions. Because the account information is incomplete, a thief, hacker, unscrupulous employee, etc. may be unable to use the incomplete information to make fraudulent purchases.

In addition, merchant node 115 may transmit a transaction information message 102 including the 4-digits of the account number (e.g., a 16 digit Primary Account Number or PAN) and the name on the credit/debit card account to authentication node 117. Authentication node 117 may process the four-digits of the account number and the name to identify the user's/customer's complete credit/debit card account number. Having identified the user's/customer's complete account number, authentication node 117 can send a confirmation request message 103 to request confirmation from the user/customer that the transaction is legitimate. More particularly, the confirmation request message 103 may be transmitted using a communication method/medium (e.g., by transmitting a text message to the user's/consumer's wireless terminal or smartphone) that is different/independent from a method/medium used to transmit/receive payment information and/or transaction complete messages 101 and 109. By using different/independent communication methods/mediums, the likelihood of a fraudulent transaction may be reduced. A criminal attempting a fraudulent transaction, for example, may need both the payment information and access to the device/medium used to receive the confirmation request message 103.

If the user/customer authorizes the transaction via the confirmation response message 104, authentication node transmits the account information message 105 to acquirer node 119, and acquirer node 119 transmits the authorization request to issuer node 121. If the issuer node 121 authorized the transaction by sending a positive authorization response message 107, acquirer node 119 transmits a positive authentication result message 109 to merchant node including a one-time confirmation code that uniquely identifies the transaction. Accordingly, a user/customer does not have to reveal the full credit card number or the billing address to the merchant, and the merchant is not required to make significant changes to their websites or operations (the merchant is just collecting less information).

According to some embodiments, authentication node 117 may be managed by a third-party (providing authentication-as-a-service) so that the issuer (i.e., credit/debit card company) does not have to significantly alter its current operations. The third-party receives the 4-digit code and credit card holder's name from merchant node 115 (e.g., via transaction information message 102), contacts the credit/debit card holder (e.g., via confirmation request message 103), and (assuming authorization from the credit/debit card holder via confirmation response message 104) sends the complete credit/debit card account number to acquirer node 119 and/or issuer node 121 (i.e., credit/debit card company) along with other identifying information using account information message 105 and/or authorization request message 106. Acquirer node 119 and issuer node 121 may process account information message 105 and/or authorization request message 106 in a manner similar to previous transactions. Assuming that the user/customer credit/debit account is current, acquirer node 119 may transmit a positive authorization result message 109 allowing merchant node 115 to complete the transaction.

According to some embodiments of inventive concepts, methods and/or systems to reduce/minimize the credit/debit card account information received and/or stored by a merchant may thus be reduced by reducing the amount of information given by users/customers and using the reduced information together with a multi-device authorization.

Embodiments of inventive concepts will now be discussed in greater detail below with respect to the flow charts of FIGS. 2 and 3. In particular, FIG. 2 illustrates operations of merchant node 115, and FIG. 3 illustrates operations of authentication node 117.

As shown in block 201 of FIG. 2, an e-commerce transaction may be initiated with merchant node 115 at block 201 by a user/customer using a browser application of user transaction terminal 111. Merchant node 115 may process the e-commerce transaction at block 203 whereby the user/customer selects goods/services to be purchased. Once the user/customer elects to "check-out", merchant node 115 may calculate a transaction amount (also referred to as a payment amount), merchant node 115 may request payment information, and the user/customer may respond with payment information message 101 that is received by merchant node 115 at block 205.

More particularly, the payment information message 101 may include an identification for a credit/debit account and a name on the credit/debit account, and the identification for the credit/debit account may be different than a complete account number for the credit/debit account. Accordingly, identification for a credit/debit account may be provided without providing the complete account number. By providing an identification for the debit/credit account that is different than the complete account number for the credit/debit account, the identification cannot be easily stolen and used to make fraudulent purchases. By way of example, the identification for the credit/debit account may be a portion of the complete account number for the credit/debit account. The complete account number for the credit/debit account (e.g., the Primary Account Number or PAN), for example, may be a 16 digit number, and the identification for the credit/debit account may be four digits (e.g., the last four digits) of the complete account number.

Responsive to receiving the payment information at block 205, merchant node 115 may transmit (207) transaction information message 102 for the transaction from the merchant node to an authentication node at block 207. More particularly, the transaction information message may include the identification for the credit/debit account, the name on the credit/debit account, and a transaction amount. In addition, the transaction information may also include a transaction identification that will allow subsequent messages for the transaction to be identified.

After transmitting transaction information message 102, merchant node 115 may receive an authorization result for the transaction at block 209, and merchant node 115 may process the transaction at blocks 211, 213, and/or 215 responsive to receiving the authorization result. The authorization result, for example, may be a transaction rejection message 105' received from authentication node 117 (e.g., if the customer/user transmits a negative confirmation response message 104) or an authentication result message 108 received from acquirer node 119.

Processing the transaction may include completing the transaction at block 213 responsive to the authorization result being positive at block 211, for example, if a positive authentication result message 108 is received at block 211). As discussed above, the positive authentication result message may include the transaction identification that was included in the corresponding transaction information message 102 so that the positive authentication result message 108 can be matched with the appropriate transaction. Completing the transaction at block 213 may thus include transmitting a transaction completion message 109 indicating successful completion of the transaction and including a confirmation number that may be used by the user/customer to later identify the transaction and/or prove payment.

In the alternative, processing the transaction may include canceling the transaction at block 215 responsive to the authorization result being negative at block 211, for example, if a transaction rejection message 105' is received from authentication node 117 at block 211 or if a negative authentication result message 108 is received at block 211). As discussed above, the negative authentication result message 108 and/or the transaction rejection message 105' may include the transaction identification that was included in the corresponding transaction information message 102 so that the negative authentication result message 108 and/or the transaction rejection message 105' can be matched with the appropriate transaction. Canceling the transaction at block 215 may thus include transmitting a transaction completion message 109 indicating cancellation of the transaction.

In addition, merchant node 115 may save the identification and the name for the credit/debit account together with the shipping address for future transactions, for example, allowing "one click" check out. In a future transaction with the same customer/user, the customer/user may use the saved information so that the customer/user is not required re-enter this information. Because the identification for the credit/debit account is not the complete account number, a hacker or dishonest employee may be unable to use the saved information to make fraudulent purchases.

In addition, a merchant identification associated with the merchant node may be provided to route messages back to the merchant node. According to some embodiments, the merchant identification may be included in the transaction identification. More particularly, the merchant identification may be included in transaction information message 102, account information message 105, authorization request message 106, and/or authorization response message 107. Accordingly, authentication node 117 and/or acquirer node 119 can use the merchant identification to route transaction rejection message 105' and/or authentication result message 108 to the correct originating merchant node that sent the corresponding transaction information message 102.

The flow chart of FIG. 3 illustrates operations of authentication node 117 for a given transaction discussed above with respect to FIGS. 1 and 2. As discussed above with respect to block 207 of FIG. 2, merchant node 115 may transmit transaction information message 102 for a transaction including the identification for the credit/debit account, the name for the credit/debit account, and the transaction amount for the transaction. Authentication node 117 may thus receive the transaction information message 102 at block 301 to initiate authentication of the credit/debit account being used to pay for the associate transaction. As discussed above, the identification may be a portion of the complete account number for the credit/debit account. For example, the complete account number for the credit/debit account may be a 16 digit number, and the identification may be four digits (e.g., the last four digits) of the complete account number.

Responsive to receiving the transaction information message 102 at block 301 of FIG. 3, authentication node 117 may determine a complete account number for the credit/debit account using the identification for the credit/debit account and the name on the credit/debit account at block 303. As discussed above, the identification for the credit/debit account is different than the complete account number for the credit/debit account. Authentication node 117, for example, may have access to a database (for example, in local memory of authentication node 117, in remote memory such as issuer node 121, etc.) providing complete account numbers for credit/debit accounts to be authorized. The table of FIG. 5 illustrates elements of such a database according to some embodiments.

As shown in FIG. 5, the database may include a row for each credit/debit account in the system, and for each credit/debit account in the system, the database may provide a complete credit/debit account number (e.g., a 16 digit account number), a different identification of the credit/debit account (e.g., 4 digits of the 16 digit account number, a separate code, etc.), a name for the credit/debit account (e.g., a name of the cardholder for the credit/debit account), contact information to be used for the confirmation request (e.g., a mobile telephone number to allow text messaging to the cardholder), and a threshold transaction amount use to determine whether a confirmation request is required. If the identification for a credit/debit account is a subset of digits of the respective account number, a separate column/field for the identification may be omitted. The threshold for confirmation may be determined based on the account type, designated by the cardholder, etc. While not shown, the database may include additional information for each account, such as a billing address, and such additional information may be used to match a transaction information message 102 including such additional information to a particular account.

Using a database as illustrated 5, authentication node 117 may use the identification and name (and/or other information) received in transaction information message 102 to identify the associated credit/debit account number, contact information, and threshold for the respective transaction. If a threshold for confirmation is specified in the database, the transaction amount identified in the transaction information message may be compared to the threshold for confirmation for the respective credit/debit account at block 305. If the transaction amount is less than the threshold at block 305, authentication node 117 may transmit account information to acquirer node at block 311 as discussed in greater detail below.

If there is no threshold or if the transaction amount is greater than the threshold at block 305, authentication node may transmit a confirmation request message 103 at block 307 as discussed in greater detail below. At block 307, authentication node 117 may transmit a confirmation request message 103 to the customer/user associated with the credit/debit account responsive to receiving the transaction information message 102 and responsive to the transaction amount exceeding the respective threshold. The confirmation request message may include the transaction amount and/or an identification of the merchant (e.g., provided as merchant branding) to allow the customer/user to identify the transaction for which confirmation is being requested. Moreover, the confirmation request message (e.g., a text message) may be directed/addressed/routed to the customer/user based on the contact information (e.g., a mobile telephone number for the customer/user) of FIG. 5.

The customer/user may thus receive the confirmation request message 103 (e.g., a text message) using wireless terminal 113, and the customer/user can either accept or reject the transaction by transmitting a confirmation response message 104 (e.g., a text message response to confirmation request message 103). If the cardholder did not initiate the transaction discussed above with respect to payment information message 101 and transaction information message 102, the customer/user can stop the fraudulent transaction by transmitting a confirmation response message 104 (e.g., a text message) rejecting the transaction (also referred to as a negative confirmation response message). If the cardholder is the customer/user who initiated the transaction discussed above with respect to payment information message 101 and transaction information message 102, the customer/user can accept the intended transaction by transmitting a confirmation response message 104 (e.g., a text message) accepting the transaction (also referred to as a positive confirmation response message).

Responsive to the transaction amount being less than the threshold at block 305 and/or responsive to receiving a positive confirmation response from the customer/user associated with the credit/debit account, authentication node 117 may transmit account information message 105 to acquirer node 119 at block 311, and account information message 105 may include the complete account number for the credit/debit account, the name on the credit/debit account, and the transaction amount. Responsive to receiving a negative confirmation response message from the customer/user associated with the credit/debit account, a negative authorization result message 105' may be transmitted to merchant node 115 for the transaction at block 313.

In addition, merchant node 115 may transmit transaction information message 102 including a merchant identification/address (also referred to as a merchant address) associated with merchant node 115 and/or an acquirer identification/address associated with acquirer node 119. The merchant identification/address may be used by authentication node 117 and/or acquirer node 119 to transmit transaction rejection message 105' and/or authorization result message 108 for the associated transaction to merchant node 115. The merchant identification/address (also referred to as a merchant identification) may thus be included in transaction information message 102, in account information message 105, in transaction rejection message 105', and/or authorization result message 108 for a given transaction. The acquirer identification/address (also referred to as an acquirer identification) may be used by merchant node 117 to transmit account information message 105 the appropriate acquirer node for the bank that is used by the merchant node that initiated the transaction being authorized. The acquirer identification/address may thus be included in transaction information message 102 and account information message 105 for a given transaction.

According to some embodiments, merchant node 115 may receive an identification for the credit/debit account that is a portion of the complete account number for the credit/debit account. For example, the identification for the credit/debit account may be four digits (e.g., the last four digits) of the complete account number for the credit/debit account (also referred to as the Primary Account Number or PAN), which may be a 16 digit number. Before transmitting the transaction information at block 207, merchant node 115 may pad the identification for the credit/debit account with additional padding digits so that the identification for the credit/debit account is transmitted as part of a larger identification (also referred to as a padded identification) having a same length as the complete account number for the credit/debit account. For example, the identification for the credit/debit account number may be four digits (e.g., the last four digits) of the complete account number for the credit/debit account, and merchant node 115 may pad the identification with 12 additional padding digits so that the identification for the credit/debit account is transmitted as part of a 16 digit number (referred to as the padded identification) at block 207.

By padding the identification for the credit/debit account with additional padding digits to match the length of a normal complete account number, the merchant node 115 may process the transaction information 102 in a manner similar to that used for conventional credit/debit card authorization messages. The padding digits, for example, may be dummy digits used to provide a field of a transaction information message 102 having a particular length. In an alternative, the padding digits may be used to encode additional information. For example, the padding digits could include a special bank identification number (BIN) used to support routing of subsequent messages (e.g., used to support routing of transaction information message 102, transaction rejection message 105', account information message, authorization request message 106, authorization response message 107, authorization result message 108, etc. Moreover, the padding digits may be provided at merchant node 115 using a lightweight JavaScript mechanism.

Authentication node 117 may thus receive the transaction information message 102 at block 301 including the padded identification. For example, the padded identification may include a portion of the complete account number (e.g., the last four digits of the complete account number) and padding digits (e.g., 12 padding digits including dummy digits and/or a special bank identification number or BIN). Authentication node 117 may thus use the portion of the complete account number included in the padded identification to determine the complete account number as discussed above with respect to block 303. If the padding digits include a special BIN, authentication node 117 may used the special BIN for routing/processing of subsequent messages.

The identification for the credit/debit account may thus be a portion of a padded identification including the identification for the credit/debit account and padding digits. As discussed above, the identification for the credit/debit account may be a portion of the digits (e.g., four digits or the last four digits) of the complete account number for the credit/debit account, and a sum of a number of digits of the identification for the credit/debit account (e.g., 4 digits) and a number of padding digits (e.g., 12 digits) may be equal to a number of digits of the complete account number (e.g., 16 digits).

FIG. 4 is a block diagram illustrating a computer system 1100 that may be used as one or more of user transaction terminal 111, a merchant node 115, an authentication node 117, an acquirer node 119, and/or a credit/debit finance issuer node 121 (also referred to as an issuer node) to perform the operations of one of more of the embodiments disclosed herein for one or more of those elements. The computer system 1100 can include one or more network interface circuits 1130, one or more processor circuits 1110 (referred to as "processor" for brevity), and one or more memory circuits 1140 (referred to as "memory" for brevity) containing program code 1150. Moreover, a network interface circuit 1130 may provide transmission/reception of messages to/from other nodes, for example, over a network such as a wide area network, a local area network, the Internet, etc.

The processor 1110 may include one or more data processing circuits, such as a general purpose and/or special purpose processor (e.g., microprocessor and/or digital signal processor) that may be collocated or distributed across one or more networks. The processor 1110 is configured to execute program code 1122 in the memory 1120, described below as a computer readable storage medium, to perform some or all of the operations for one or more of the embodiments disclosed herein.

According to some embodiments disclosed herein, merchant node 115 may be implemented as a computer system 1100 as illustrated in FIG. 4 including processor 1110, and memory 1140 coupled to processor 1110. More particularly, memory 1140 in merchant node 115 may include computer readable program code that when executed by processor 1110 causes processor 1110 to perform operations discussed above with respect to FIG. 2. Similarly, a computer program product for merchant node 115 may include a computer readable storage medium having computer readable program code embodied in the computer readable storage medium that when executed by processor 1110 of computer system 1100 causes computer system 1100 to perform operations discussed above with respect to FIG. 2.

According to some embodiments disclosed herein, authentication node 117 may be implemented as a computer system 1100 as illustrated in FIG. 4 including processor 1110, and memory 1140 coupled to processor 1110. More particularly, memory 1140 in authentication node 117 may include computer readable program code that when executed by processor 1110 causes processor 1110 to perform operations discussed above with respect to FIG. 3. Similarly, a computer program product for authentication node 117 may include a computer readable storage medium having computer readable program code embodied in the computer readable storage medium that when executed by processor 1110 of computer system 1100 causes computer system 1100 to perform operations discussed above with respect to FIG. 3.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component" or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PRP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of inventive concepts disclosed herein. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain principles of the disclosure and practical applications, and to enable others of ordinary skill in the art to understand the disclosure with various modifications as are suited to particular uses contemplated.

The invention claimed is:

1. A method of operating an authentication node, the method comprising:

receiving transaction information for a transaction at a processor of the authentication node from a merchant node, wherein the transaction information comprises an identification for a credit/debit account, a name on the credit/debit account, a transaction identification for the transaction, and a transaction amount for the transaction, wherein the transaction information is received at the processor of the authentication node from the merchant node through a network interface of the authentication node;

responsive to receiving the transaction information, transmitting a confirmation request by the processor to a user device associated with the credit/debit account, wherein the confirmation request is transmitted by the processor through the network interface to the user device;

receiving a positive confirmation response at the processor from the user device associated with the credit/debit account, wherein the positive confirmation response corresponds to the confirmation request, and wherein the positive confirmation response is received at the processor through the network interface from the user device;

responsive to receiving the transaction information, determining a complete account number for the credit/debit account at the processor of the authentication node using the identification for the credit/debit account and the name on the credit/debit account, wherein the identification for the credit/debit account is different than the complete account number for the credit/debit account, wherein the identification for the credit/debit account that is received from the merchant node comprises a portion of the complete account number for the credit/debit account and wherein the identification for the credit/debit account that is received from the merchant node omits another portion of the complete account number; and responsive to receiving the positive confirmation response from the user device associated with the credit/debit account, transmitting account information by the processor of the authentication node to an acquirer node, wherein the account information comprises the complete account number for the credit/debit account, the name on the credit/debit account, the transaction identification, and the transaction amount, and wherein the account information is transmitted by the processor through the network interface to the acquirer node.

2. The method of claim 1, wherein the confirmation request comprises the transaction amount.

3. The method of claim 1, wherein the transaction information comprises first transaction information for a first transaction, wherein the identification is a first identification, wherein the credit/debit account is a first credit/debit account, wherein the name is a first name, wherein the transaction identification is a first transaction identification, wherein the transaction amount is a first transaction amount, wherein the confirmation request is a first confirmation request, and wherein the user device is a first user device, the method further comprising:

receiving second transaction information for a second transaction at the processor of the authentication node from the merchant node, wherein the second transaction information comprises a second identification for a second credit/debit account, a second name on the second credit/debit account, a second transaction identification for the second transaction, and a second transaction amount for the second transaction, wherein the second transaction information is received at the processor of the authentication node from the merchant node through the network interface of the authentication node;

responsive to receiving the second transaction information, transmitting a second confirmation request by the processor to a second user device associated with the second credit/debit account, wherein the second transaction information is transmitted by the processor through the network interface to the second user device;

receiving a negative confirmation response at the processor from the second user device associated with the second credit/debit account, wherein the negative confirmation response corresponds to the second confirmation request, and wherein the negative confirmation response is received at the processor through the network interface from the second user device; and responsive to receiving the negative confirmation response from the second user device associated with the second credit/debit account, transmitting a negative authorization result by the processor to the merchant node for the second transaction, wherein the negative authorization result includes the second transaction identification for the second transaction, wherein the negative authorization result is transmitted by the processor through the network interface to the merchant node.

4. The method of claim 1, the method further comprising:
comparing at the processor the transaction amount to a threshold, wherein transmitting the confirmation request comprises transmitting a confirmation request to the user device associated with the credit/debit account responsive to the transaction amount exceeding the threshold.

5. The method of claim 1, wherein the transaction information comprises a merchant identification associated with the merchant node, and wherein the account information comprises the merchant identification associated with the merchant node.

6. The method of claim 5 wherein the transaction information comprises an acquirer identification associated with the acquirer node, and wherein transmitting the account information comprises transmitting the account information to the acquirer node based on the acquirer identification.

7. The method of claim 1, wherein the complete account number for the credit/debit account comprises a 16 digit number, and wherein the identification comprises four digits of the complete account number.

8. The method of claim 1 wherein the identification for the credit/debit account is a portion of a padded identification including the identification for the credit/debit account and padding digits.

9. A method of operating a merchant node, the method comprising:

receiving payment information for a transaction from a user device, wherein the payment information comprises an identification for a credit/debit account and a name on the credit/debit account, wherein the identification is different than a complete account number for the credit/debit account, wherein the payment information is received by a processor of the merchant node through a network interface of the merchant node from the user device;

responsive to receiving the payment information, transmitting transaction information for the transaction from the merchant node to an authentication node, wherein the transaction information comprises the identification for the credit/debit account, the name on the credit/debit account, a transaction identification for the transaction, and a transaction amount, and wherein the transaction information is transmitted by the processor of the merchant node through the network interface to the authentication node, wherein the identification for the credit/debit account that is transmitted to the authentication node comprises a portion of the complete account number for the credit/debit account and wherein the identification for the credit/debit account that is transmitted to the authentication node omits another portion of the complete account number;

after transmitting the transaction information to the authentication node, receiving an authorization result for the transaction from an acquirer node, wherein the authorization result includes the transaction identification for the transaction, wherein the authorization result is received by the processor through the network interface from the acquirer node; and responsive to receiving the authorization result, processing by the processor the transaction, wherein processing the transaction comprises completing the transaction responsive to the authorization result from the acquirer node being positive.

10. The method of claim 9 wherein receiving the payment information for the transaction comprises receiving the identification for the credit/debit account from the user device without receiving the complete account number for the credit/debit account from the user device.

11. The method of claim 9 wherein the complete account number for the credit/debit account comprises a 16 digit number, and wherein the identification comprises four digits of the complete account number.

12. The method of claim 11 wherein the partial account number for the credit/debit account comprises a last 4 digits of the account number.

13. The method of claim 9, wherein the payment information is first payment information, wherein the transaction is a first transaction, wherein the user device is a first user device, wherein the identification is a first identification, wherein the credit/debit account is a first credit/debit account, wherein the transaction identification is a first transaction identification, wherein the name is a first name, wherein the complete account number is a first complete account number, wherein the transaction information is first transaction information, wherein the transaction amount is a first transaction amount, wherein the authorization result is a first authorization result, the method further comprising:

receiving second payment information for a second transaction from a second user device, wherein the second payment information comprises a second identification for a second credit/debit account and a second name on the second credit/debit account, wherein the second identification is different than a second complete account number for the second credit/debit account, wherein the second payment information is received by the processor through the network interface from the second user device;

responsive to receiving the second payment information, transmitting second transaction information for the second transaction from the merchant node to the authentication node, wherein the second transaction information comprises the second identification for the second credit/debit account, the second name on the second credit/debit account, a second transaction identification for the second transaction, and a second transaction amount, and wherein the second transaction information is transmitted by the processor through the network interface to the authentication node;

after transmitting the second transaction information to the authentication node, receiving a negative authorization result for the second transaction from the authentication node, wherein the negative authorization includes the second transaction identification, wherein the negative authorization result for the second transaction is received by the processor through the network interface from the authentication node; and responsive to receiving the negative authorization result for the second transaction, processing by the processor the second transaction, wherein processing the second transaction comprises canceling the second transaction responsive to the negative authorization result for the second transaction.

14. The method of claim 9 further comprising:
saving the identification and the name for future transactions by the user device, wherein the identification and the name are saved by the processor of the merchant node.

15. A computer system comprising:
a processor;
a network interface coupled to the processor; and
a memory coupled to the processor and comprising computer readable program code that when executed by the processor causes the processor to perform operations comprising:

receiving transaction information for a transaction from a merchant node through the network interface, wherein the transaction information comprises an identification for a credit/debit account, a name on the credit/debit account, a transaction identification for the transaction, and a transaction amount for the transaction;

transmitting a confirmation request through the network interface to a user device associated with the credit/debit account responsive to receiving the transaction information;

receiving a positive confirmation response through the network interface from the user device associated with the credit/debit account, wherein the positive confirmation response corresponds to the confirmation request;

determining a complete account number for the credit/debit account using the identification for the credit/debit account and the name on the credit/debit account responsive to receiving the transaction information, wherein the identification for the credit/debit account is different than the complete account number for the credit/debit account, wherein the identification for the credit/debit account that is received from the merchant node comprises a portion of the complete account number for the credit/debit account and wherein the identification for the credit/debit account that is received from the merchant node omits another portion of the complete account number; and transmitting account information through the network interface to an acquirer node responsive to receiving the positive confirmation response from the user device associated with the credit/debit account, wherein the account information comprises the complete account number for the credit/debit account, the name on the credit/debit account, the transaction identification, and the transaction amount, and wherein the account information is transmitted by the processor through the network interface to the acquirer node.

16. A computer program product comprising:
a non-transitory computer readable storage medium having computer readable program code embodied in the computer readable storage medium that when executed by a processor of a computer system causes the computer system to perform operations comprising: receiving transaction information for a transaction from a merchant node, wherein the transaction information comprises an identification for a credit/debit account, a name on the credit/debit account, a transaction identification for the transaction, and a transaction amount for the transaction, wherein the transaction information is received by the processor through a network interface from the merchant node;
transmitting a confirmation request through the network interface to a user device associated with the credit/debit account responsive to receiving the transaction information; receiving a positive confirmation response through the network interface from the user device associated with the credit/debit account, wherein the positive confirmation response corresponds to the confirmation request;
determining a complete account number for the credit/debit account using the identification for the credit/debit account and the name on the credit/debit account responsive to receiving the transaction information, wherein the identification for the credit/debit account is different than the complete account number for the credit/debit account wherein the identification for the credit/debit account that is received from the merchant node comprises a portion of the complete account number for the credit/debit account and wherein the identification for the credit/debit account that is received from the merchant node omits another portion of the complete account number; and
transmitting account information through the network interface to an acquirer node responsive to receiving the positive confirmation response from the user device associated with the credit/debit account, wherein the account information comprises the complete account number for the credit/debit account, the name on the credit/debit account, the transaction identification for the transaction, and the transaction amount, and wherein the account information is transmitted by the processor through the network interface to the acquirer node.

17. The method of claim 3, wherein the first confirmation request comprises a first confirmation request text message, wherein the positive confirmation response comprises a positive confirmation response text message, wherein the second confirmation request comprises a second confirmation request text message, and wherein the negative confirmation response comprises a negative confirmation response text message.

18. The computer system of claim 15, wherein the transaction information comprises first transaction information for a first transaction, wherein the identification is a first identification, wherein the credit/debit account is a first credit/debit account, wherein the name is a first name, wherein the transaction amount is a first transaction amount, wherein the transaction identification is a first transaction identification, wherein the confirmation request is a first confirmation request, and wherein the user device is a first user device, wherein the computer readable program code when executed by the processor causes the processor to perform further operations comprising:

receiving second transaction information for a second transaction through the network interface from the merchant node, wherein the second transaction information comprises a second identification for a second credit/debit account, a second name on the second credit/debit account, a second transaction identification for the second transaction, and a second transaction amount for the second transaction;
transmitting a second confirmation request through the network interface to a second user device associated with the second credit/debit account responsive to receiving the second transaction information;
receiving a negative confirmation response through the network interface from the second user device associated with the second credit/debit account, wherein the negative confirmation response corresponds to the second confirmation request; and
transmitting a negative authorization result through the network interface to the merchant node for the second transaction responsive to receiving the negative confirmation response from the second user device associated with the second credit/debit account, wherein the negative authorization includes the second transaction identification for the second transaction.

19. The computer system of claim 18, wherein the first confirmation request comprises a first confirmation request text message, wherein the positive confirmation response comprises a positive confirmation response text message, wherein the second confirmation request comprises a second confirmation request text message, and wherein the negative confirmation response comprises a negative confirmation response text message.

20. The method of claim 13 further comprising:
receiving third payment information for a third transaction from a third user device, wherein the third payment information comprises a third identification for a third credit/debit account and a third name on the third credit/debit account, wherein the third identification is different than a third complete account number for the third credit/debit account, wherein the third payment information is received by the processor through the network interface from the third user device;
responsive to receiving the third payment information, transmitting third transaction information for the third transaction from the merchant node to the authentication node, wherein the third transaction information comprises the third identification for the third credit/debit account, the third name on the third credit/debit account, a third transaction identification for the third transaction, and a third transaction amount, and wherein the third transaction information is transmitted by the processor through the network interface to the authentication node;
after transmitting the third transaction information to the authentication node, receiving a negative authorization result for the third transaction from the acquirer node, wherein the negative authorization result includes the third transaction identification, wherein the negative authorization result for the third transaction is received by the processor through the network interface from the acquirer node; and
responsive to receiving the negative authorization result for the third transaction, processing by the processor the third transaction, wherein processing the third transaction comprises canceling the third transaction responsive to the negative authorization result for the third transaction.

* * * * *